(12) United States Patent
Nakano et al.

(10) Patent No.: US 10,351,444 B2
(45) Date of Patent: Jul. 16, 2019

(54) FILTRATION TREATMENT SYSTEM AND FILTRATION TREATMENT METHOD

(71) Applicant: ORGANO CORPORATION, Tokyo (JP)

(72) Inventors: Toru Nakano, Tokyo (JP); Yudai Suzuki, Tokyo (JP); Hiro Yoshikawa, Tokyo (JP)

(73) Assignee: ORGANO CORPORATION, Tokyo (JP)

(*) Notice: Subject to any disclaimer, the term of this patent is extended or adjusted under 35 U.S.C. 154(b) by 189 days.

(21) Appl. No.: 15/306,647

(22) PCT Filed: Feb. 17, 2015

(86) PCT No.: PCT/JP2015/054269
§ 371 (c)(1),
(2) Date: Oct. 25, 2016

(87) PCT Pub. No.: WO2015/170495
PCT Pub. Date: Nov. 12, 2015

(65) Prior Publication Data
US 2017/0044029 A1 Feb. 16, 2017

(30) Foreign Application Priority Data
May 8, 2014 (JP) .................................. 2014-096585

(51) Int. Cl.
C02F 1/44 (2006.01)
B01D 61/04 (2006.01)
(Continued)

(52) U.S. Cl.
CPC ............ C02F 1/441 (2013.01); B01D 61/025 (2013.01); B01D 61/04 (2013.01); B01D 61/58 (2013.01);
(Continued)

(58) Field of Classification Search
None
See application file for complete search history.

(56) References Cited

U.S. PATENT DOCUMENTS 4,988,444 A 1/1991 Applegate
4,992,209 A 2/1991 Smyk et al.
(Continued)

FOREIGN PATENT DOCUMENTS

CN 1337919 A 2/2002
CN 101652326 A 2/2010
(Continued)

OTHER PUBLICATIONS

International Search Report issued in Patent Application No. PCT/JP2015/054269, dated May 19, 2015.
(Continued)

Primary Examiner — Chester T Barry
(74) Attorney, Agent, or Firm — Greenblum & Bernstein, P.L.C.

(57) ABSTRACT

This filtration treatment system is provided with a membrane filtration device as a prefiltration treatment device for removing insoluble components from the water to be treated containing organic substance, a reverse osmosis membrane treatment device for subjecting the prefiltration-treated water to reverse osmosis membrane treatment, and a chemical agent supply pipe for supplying a chemical agent into the membrane filtration device, wherein the chemical agent contains a sulfamic acid compound, and a bromine-based oxidizing agent or the reaction product of a bromine compound with a chlorine-based oxidizing agent, or, contains the reaction product of a sulfamic acid compound with a bromine-based oxidizing agent or with the reaction product of a bromine compound with a chlorine-based oxidizing agent.

16 Claims, 6 Drawing Sheets

(51) Int. Cl.
*B01D 61/02* (2006.01)
*B01D 65/02* (2006.01)
*C02F 1/76* (2006.01)
*B01D 61/58* (2006.01)
*C02F 101/30* (2006.01)
*B01D 61/14* (2006.01)

(52) U.S. Cl.
CPC .............. *B01D 65/02* (2013.01); *C02F 1/766* (2013.01); *B01D 61/145* (2013.01); *B01D 2311/04* (2013.01); *B01D 2311/12* (2013.01); *B01D 2311/2649* (2013.01); *B01D 2321/02* (2013.01); *B01D 2321/04* (2013.01); *B01D 2321/162* (2013.01); *B01D 2321/164* (2013.01); *B01D 2321/168* (2013.01); *B01D 2321/18* (2013.01); *C02F 1/442* (2013.01); *C02F 1/444* (2013.01); *C02F 2101/30* (2013.01); *C02F 2209/06* (2013.01); *C02F 2305/02* (2013.01)

(56) References Cited

U.S. PATENT DOCUMENTS

| | | | |
|---|---|---|---|
| 6,015,782 | A | 1/2000 | Petri et al. |
| 6,037,318 | A | 3/2000 | Na |
| 6,068,861 | A | 5/2000 | Moore, Jr. et al. |
| 6,123,870 | A | 9/2000 | Yang et al. |
| 6,156,229 | A * | 12/2000 | Yang ............... A61L 2/18 252/186.1 |
| 6,287,473 | B1 | 9/2001 | Yang et al. |
| 6,303,037 | B1 | 10/2001 | Tamura et al. |
| 6,423,267 | B1 | 7/2002 | Yang et al. |
| 6,699,684 | B2 | 3/2004 | Ho |
| 6,723,241 | B2 * | 4/2004 | Mickols ............ B01D 69/125 210/490 |
| 2001/0052503 | A1* | 12/2001 | DeLonge ............ B01D 24/14 210/749 |
| 2002/0110603 | A1 | 8/2002 | Moore, Jr. et al. |
| 2003/0080058 | A1* | 5/2003 | Kimura ............... A61L 2/18 210/636 |
| 2006/0032823 | A1 | 2/2006 | Harrison et al. |
| 2006/0051284 | A1 | 3/2006 | Fishler et al. |
| 2010/0025329 | A1* | 2/2010 | Kawakatsu ........ B01D 61/04 210/638 |
| 2010/0035950 | A1 | 2/2010 | Sauer et al. |
| 2010/0187175 | A1 | 7/2010 | Kolios et al. |
| 2011/0297614 | A1* | 12/2011 | Ikuno ................. A01N 59/00 210/639 |
| 2013/0048558 | A1* | 2/2013 | Arai ................... C02F 9/00 210/615 |
| 2013/0189379 | A1* | 7/2013 | Nalepa ............... A01N 59/00 424/723 |
| 2015/0045276 | A1* | 2/2015 | Aoki ................. B01D 65/02 510/162 |
| 2015/0209700 | A1* | 7/2015 | Voigt ................. B01D 61/18 210/489 |
| 2016/0198721 | A1 | 7/2016 | Yoshikawa et al. |

FOREIGN PATENT DOCUMENTS

| | | |
|---|---|---|
| CN | 102015078 | 4/2011 |
| JP | 7-163979 | 6/1995 |
| JP | H09-94585 | 4/1997 |
| JP | 9-220449 | 8/1997 |
| JP | 11-501974 | 2/1999 |
| JP | 11-511779 | 10/1999 |
| JP | 2002-516827 | 6/2002 |
| JP | 2002-543048 | 12/2002 |
| JP | 2003-117553 | 4/2003 |
| JP | 2005-537920 | 12/2005 |
| JP | 2006-263510 | 10/2006 |
| JP | 2010-515759 | 5/2010 |
| JP | 2011-50843 | 3/2011 |
| JP | 2013-34938 | 2/2013 |
| JP | 2013-169511 | 9/2013 |
| JP | 2013-202481 | 10/2013 |
| JP | 2014-101251 | 6/2014 |
| KR | 1020110007180 | 1/2011 |
| TW | I237009 | 8/2005 |
| TW | 201139300 A | 11/2011 |
| WO | 99/06320 | 2/1999 |
| WO | 99/62339 | 12/1999 |
| WO | 00/64806 | 11/2000 |
| WO | 2009/128328 | 10/2009 |
| WO | 2015/029504 | 3/2015 |

OTHER PUBLICATIONS

International Preliminary Report on Patentability issued in Patent Application No. PCT/JP2015/054269, dated Nov. 17, 2016.
Japanese Office Action issued in Counterpart Patent Appl. No. 2016-517824, dated Apr. 18, 2017, along with an english translation thereof.
Korean Office Action with English Translation in respect to Korean Application No. 10-2016-7031143, dated Feb. 12, 2018.
Singapore International Search Report for Singapore Application No. 11201609169U, dated Dec. 13, 2017.
Singapore Written Opinion for Singapore Application No. 11201609169U, dated Dec. 13, 2017.
Japanese Office Action issued in Counterpart Patent Appl. No. 2016-517824, dated Nov. 21, 2017, along with an English translation thereof.
Official Action relating to the corresponding Korean Patent Application No. 10-2016-7031143 dated Aug. 10, 2018.
Written Opinion for the corresponding Singapore Application No. 11201609169U dated Sep. 19, 2018.
Office Action issued in the corresponding Chinese Patent Application No. 201580042407.5 dated Sep. 14, 2018.
Decision of Rejection issued in Korean Patent Application No. 10-2016-7031143 dated Sep. 21, 2018.
Non-final Office Action issued in co-pending U.S. Appl. No. 14/912,763 dated Jul. 5, 2018.
Korean Decision of Rejection with English Translation in respect to Korean Application No. 10-2016-7004146, dated Jan. 31, 2018.
Chinese Office Action issued in Counterpart Patent Appl. No. 2014800476641, dated Nov. 28, 2016, along with an English translation thereof.
Chinese Third Notice of Grounds for Rejection with English Translation in respect to Chinese Patent Application No. 201480047664.1, dated Dec. 8, 2017.
Office Action issued in China Counterpart Patent Appl. No. 201480047664.1, dated Jun. 13, 2017, along with and English translation thereof.
Korean Search Report issued in Patent Application No. 10-2016-7004146, dated Aug. 4, 2017, with English translation thereof.
Notice of Grounds for Rejection in Japanese Application No. 2012-254118, dated Jan. 12, 2016, along with and English translation thereof.
International Search Report issued in PCT/JP2014/062571, dated Jun. 17, 2014.
International Preliminary Examination Report in PCT/JP2014/062571, dated Mar. 1, 2016.
Singaporean Search Report issued in Patent Application No. 11201601207U, dated Nov. 8, 2016.
Singaporean Search Report issued in Patent Application No. 10201702983P, dated Sep. 7, 2017.
Japanese Notice of Grounds for Rejection in respect to Japanese Application No. 2014-090914, dated Jan. 30, 2018.
Saudi Arabian Notice of Substantive Examination Report with English Translation in respect to Saudi Arabian Application No. 516370626, dated Jan. 8, 2018.
Korean Decision of Rejection with English Translation in respect to Korean Application No. 10-2016-7004146, dated Apr. 11, 2018.
Examination Report issued in Corresponding Indian Patent Application No. 201617035564 dated Oct. 11, 2018.

(56) References Cited

OTHER PUBLICATIONS

Office Action issued in Korea Patent Application No. 10-2018-7029940, dated Nov. 14, 2018, with English translation.
English translation of Notice of Allowance in Taiwanese Application 104106118.
First Office Action (dated Jan. 16, 2018) in Taiwanese Application 104104118, and English language translation thereof.
Second Office Action (dated May 10, 2018) in Taiwanese Application 104104118, and English language translation thereof.
Second Office Action in Chinese application No. 201580024207.5 dated Feb. 19, 2019 and English language translation thereof.
Office Action in Japanese family member application Serial No. 2018-020949, dated Apr. 16, 2019 and English language translation thereof.
Office Action in Korean family member application Serial No. 10-2018-7029940, dated Apr. 12, 2019 and English language translation thereof.

* cited by examiner

FILTRATION TREATMENT SYSTEM AND FILTRATION TREATMENT METHOD

TECHNICAL FIELD

The present invention relates to a filtration treatment system and a filtration treatment method in which a reverse osmosis membrane treatment using a reverse osmosis membrane is performed following a prefiltration treatment such as a membrane filtration or a sand filtration.

BACKGROUND ART

When a water that requires treatment is subjected to a filtration treatment over an extended period of time using a sand filtration device or a membrane filtration device including a separation membrane, impurities that cannot be removed by physical cleaning with air or the like tend to adhere to and accumulate on the membrane surface, within the membrane, or on the sand surface or the like, and therefore cleaning using chemicals need to be used to dissolve and remove these impurities.

Examples of the method used include a method in which the device is operated while a chemical agent such as hypochlorous acid or sodium hydroxide is added to the raw water or the backwash water, and a method provided with a chemical agent cleaning step or the like in which the membrane or the like is immersed periodically in a chemical solution containing a chemical agent (for example, see Patent Documents 1 to 3). The chemical agent cleaning step generally includes a step of dissolving or removing the impurities with a chemical agent, and a flushing step of washing away any chemical agent retained inside the membrane module.

Further, particularly in those cases when a water to be treated that contains organic substance is subjected to a filtration treatment, an oxidizing agent such as hypochlorous acid is typically added to the raw water or the backwash water for the purpose of inhibiting slime generation.

In the types of methods described above, when an oxidizing agent such as hypochlorous acid is added to the raw water or the backwash water, or an oxidizing agent cleaning step is performed, residual oxidizing agent is retained in the filtration-treated water, and if a reverse osmosis membrane treatment using a reverse osmosis membrane is performed in a later stage, the oxidizing agent enters the reverse osmosis membrane treatment device. Polyamide reverse osmosis membranes, which are generally in widespread use, are sensitive to oxidizing agents such as hypochlorous acid, and the reverse osmosis membrane tends to degrade upon exposure to oxidizing agents.

Accordingly, it has been necessary to add a reducing agent or use activated carbon or the like to remove any residual oxidizing agents prior to the reverse osmosis membrane treatment. Moreover, in order to inhibit slime generation on the reverse osmosis membrane, an additional slime control agent (antibacterial agent) also needs to be added.

For example, FIG. 2 is a schematic view illustrating a conventional filtration treatment system. In the conventional filtration treatment system illustrated in FIG. 2, a water to be treated that contains organic substance is stored in a raw water tank 50, a prefiltration treatment is then performed in a membrane filtration device 52 using a separation membrane, the prefiltration-treated water is stored in a prefiltration-treated water tank 54, an activated carbon treatment is then performed in an activated carbon column 58, and following storage of the activated carbon-treated water in an activated carbon-treated water tank 60, a reverse osmosis membrane treatment is performed in a reverse osmosis membrane treatment device 56 to obtain a concentrate and a permeate. When cleaning of the membrane filtration device 52 becomes necessary, hypochlorous acid is supplied as a cleaning chemical agent to at least a portion of the prefiltration-treated water from the prefiltration-treated water tank 54, and backwashing is performed by supplying the resulting solution to the membrane filtration device 52 as a backwash water. The hypochlorous acid remaining in the prefiltration-treated water is removed in the activated carbon column 58, and an additional slime control agent (antibacterial agent) is added upstream from the reverse osmosis membrane treatment device 56 to inhibit slime generation on the reverse osmosis membrane.

Further, in those cases where an oxidizing agent is injected into the backwash water or an oxidizing agent cleaning step is performed periodically, in order to ensure that the oxidizing agent is washed satisfactorily out of the membrane module, a large amount of wash water need to be used in the flushing step, and other problems also arise, including generation of a large amount of washing wastewater containing the oxidizing agent, and the need to use an another oxidizing agent to neutralize the washing wastewater, resulting in increased costs for wastewater treatment.

CITATION LIST

Patent Literature

Patent Document 1: JP 2013-034938 A
Patent Document 2: JP 2013-169511 A
Patent Document 3: JP 2013-202481 A

SUMMARY OF INVENTION

Technical Problem

An object of the present invention is to provide a filtration treatment system and a filtration treatment method which, in a filtration treatment in which a water to be treated that contains organic substance is subjected to a prefiltration treatment and then a reverse osmosis membrane treatment, enable a simplification of the treatment steps and a reduction in the amount of washing wastewater.

Solution to Problem

The present invention provides a filtration treatment system including a prefiltration treatment means for removing insoluble components from a water to be treated that contains organic substance, a reverse osmosis membrane treatment means for subjecting the prefiltration-treated water from the prefiltration treatment means to a reverse osmosis membrane treatment, and a chemical agent supply means for supplying a chemical agent to the prefiltration treatment means, wherein the chemical agent includes a bromine-based oxidizing agent, or a reaction product of a bromine compound and a chlorine-based oxidizing agent, and a sulfamic acid compound, or alternatively, includes a reaction product of a sulfamic acid compound with a bromine-based oxidizing agent, or with a reaction product of a bromine compound and a chlorine-based oxidizing agent.

Further, in the filtration treatment system, the chemical agent preferably either includes bromine and a sulfamic acid compound, or includes a reaction product of bromine and a sulfamic acid compound.

Furthermore, in the filtration treatment system, the chemical agent is preferably obtained by a method which includes a step of adding and reacting bromine, under an inert gas atmosphere, with a mixed solution including water, an alkali and a sulfamic acid compound.

Further, in the filtration treatment system, the pH of the prefiltration-treated water is preferably 5.5 or higher.

Furthermore, in the filtration treatment system, the pH of the water to be treated that is supplied to the prefiltration treatment means is preferably 5.5 or higher.

In addition, the present invention provides a filtration treatment method including a prefiltration treatment step of removing insoluble components from a water to be treated that contains organic substance, a reverse osmosis membrane treatment step of subjecting the prefiltration-treated water from the prefiltration treatment step to a reverse osmosis membrane treatment, and a chemical agent supply step of supplying a chemical agent to the prefiltration treatment means, wherein the chemical agent includes a bromine-based oxidizing agent, or a reaction product of a bromine compound and a chlorine-based oxidizing agent, and a sulfamic acid compound, or alternatively, includes a reaction product of a sulfamic acid compound with a bromine-based oxidizing agent, or with a reaction product of a bromine compound and a chlorine-based oxidizing agent.

Further, in the filtration treatment method, the chemical agent preferably either includes bromine and a sulfamic acid compound, or includes a reaction product of bromine and a sulfamic acid compound.

Furthermore, in the filtration treatment method, the chemical agent is preferably obtained by a method which includes a step of adding and reacting bromine, under an inert gas atmosphere, with a mixed solution including water, an alkali and a sulfamic acid compound.

Further, in the filtration treatment method, the pH of the prefiltration-treated water is preferably 5.5 or higher.

Furthermore, in the filtration treatment method, the pH of the water to be treated that is treated in the prefiltration treatment step is preferably 5.5 or higher.

Advantageous Effects of the Invention

The present invention is able to provide a filtration treatment system and a filtration treatment method which, in a filtration treatment in which a water to be treated that contains organic substance is subjected to a prefiltration treatment and then a reverse osmosis membrane treatment, enable a simplification of the treatment steps and a reduction in the amount of washing wastewater.

DESCRIPTION OF EMBODIMENTS

Embodiments of the present invention are described below. These embodiments are merely examples of implementing the present invention, and the present invention is in no way limited by these embodiments.

<Filtration Treatment System and Filtration Treatment Method>

Figure 1:
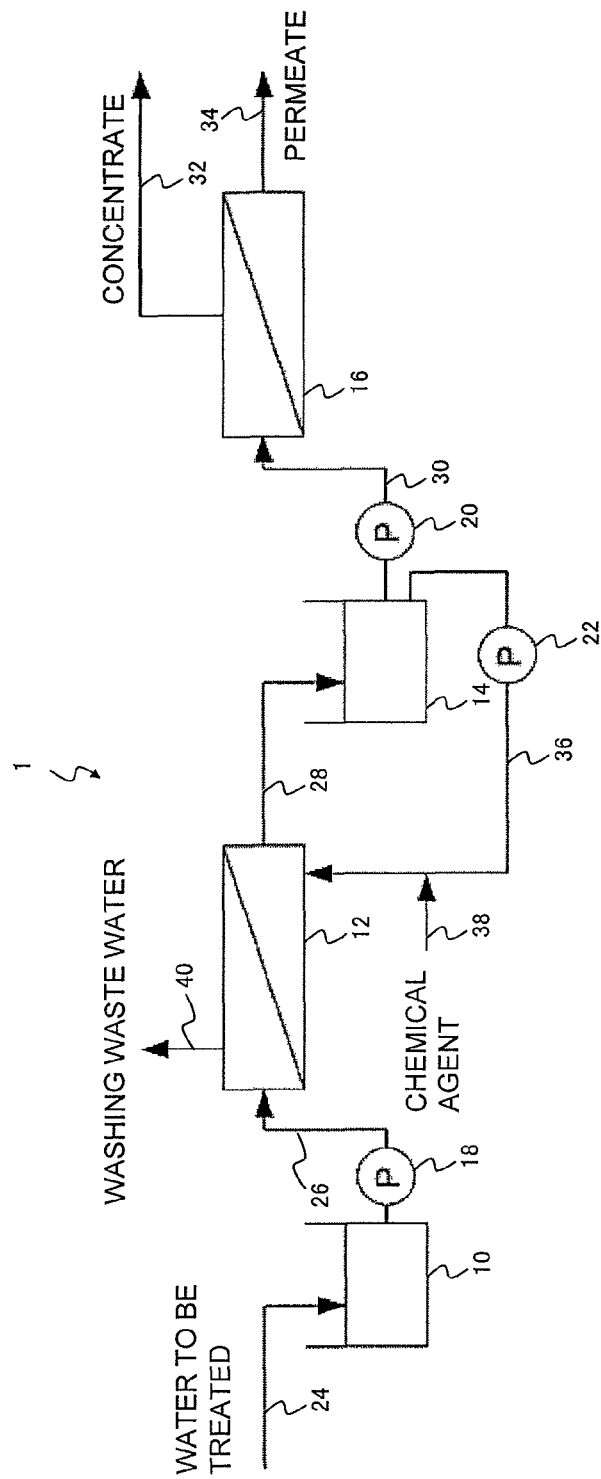
FIG. 1 is a schematic view illustrating one example of a filtration treatment system according to an embodiment of the present invention.
Figure 2:
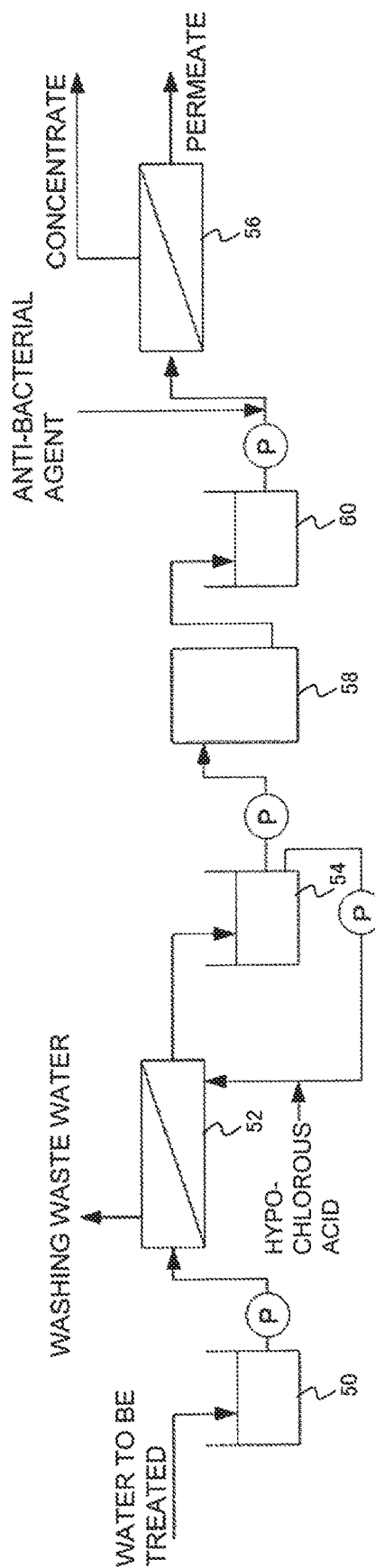
FIG. 2 is a schematic view illustrating a conventional filtration treatment system.

An outline of one example of a filtration treatment system according to an embodiment of the present invention is shown in FIG. 1, and the structure of that system is described below. The filtration treatment system 1 includes a membrane filtration device 12 provided with a separation membrane that functions as a prefiltration treatment means, and a reverse osmosis membrane treatment device 16 as a reverse osmosis membrane treatment means.

In the filtration treatment system 1 of FIG. 1, a raw water pipe 24 is connected to the inlet of a raw water tank 10, the outlet from the raw water tank 10 and the inlet of the membrane filtration device 12 are connected by a raw water supply pipe 26 via a pump 18, the outlet of the membrane filtration device 12 and the inlet of a prefiltration-treated water tank 14 are connected via a prefiltration-treated water pipe 28, an outlet of the prefiltration-treated water tank 14 and the inlet of the reverse osmosis membrane treatment device 16 are connected by a prefiltration-treated water supply pipe 30 via a pump 20, a concentrate pipe 32 is connected to a concentrate outlet, and a permeate pipe 34 is connected to a permeate outlet of the reverse osmosis membrane treatment device 16. A lower outlet of the prefiltration-treated water tank 14 and the secondary side of the membrane filtration device 12 are connected by a backwash water pipe 36 via a pump 22, and a backwash wastewater pipe 40 is connected to the primary side of the membrane filtration device 12. A chemical agent supply pipe 38 that functions as a chemical agent supply means is connected to the backwash water pipe 36 at a position downstream from the pump 22.

A filtration treatment method according to an embodiment of the present invention, and the operation of the filtration treatment system 1 are described below.

The raw water that represents the water to be treated containing organic substance passes through the raw water pipe 24, and following storage in the raw water tank 10 where necessary, is fed through the raw water supply pipe 26 and supplied to the membrane filtration device 12 by the pump 18. In the membrane filtration device 12, insoluble components are removed from the water being treated by a separation membrane (prefiltration treatment step).

Having undergone prefiltration, the prefiltration-treated water passes through the prefiltration-treated water pipe 28, and following storage in the prefiltration-treated water tank 14 where necessary, is fed through the prefiltration-treated water supply pipe 30 and supplied to the reverse osmosis membrane treatment device 16 by the pump 20. In the reverse osmosis membrane treatment device 16, a reverse osmosis membrane treatment is performed using a reverse osmosis membrane (reverse osmosis membrane treatment step).

The concentrate obtained in the reverse osmosis membrane treatment is discharged through the concentrate pipe 32, and the permeate is discharged through the permeate pipe 34.

When cleaning of the membrane filtration device 12 becomes necessary, the pump 22 is used to supply at least a portion of the prefiltration-treated water from the prefiltration-treated water tank 14 as a backwash water through the backwash water pipe 36 to the secondary side of the membrane filtration device 12, and backwashing is performed (backwash step). The backwash wastewater passes through the backwash wastewater pipe 40 and is discharged from the primary side of the membrane filtration device 12. During this time, a cleaning chemical agent passes through the chemical agent supply pipe 38 and is supplied to the backwash water in the backwash water pipe 36 at a position downstream from the pump 22 (chemical agent supply step), and the wash water containing the chemical agent is used to backwash the separation membrane and the like of the membrane filtration device 12.

Figure 6:
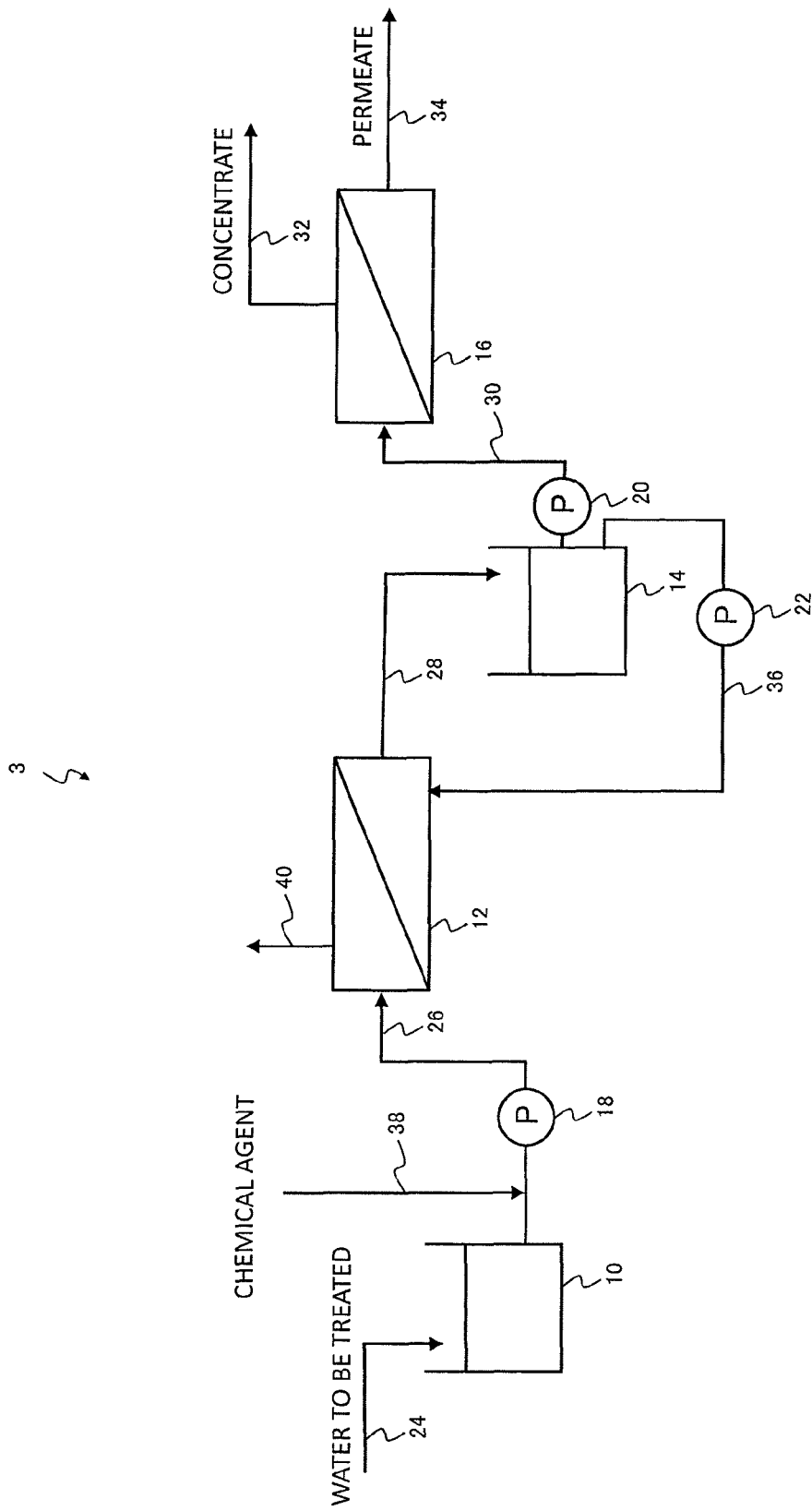
FIG. 6 is a schematic view illustrating another example of a filtration treatment system according to an embodiment of the present invention.

An outline of another example of a filtration treatment system according to an embodiment of the present invention is shown in FIG. 6. In the filtration treatment system 1 of FIG. 1, the chemical agent supply pipe 38 is connected to the backwash water pipe 36 at a position downstream from the pump 22, but in the filtration treatment system 3 illustrated in FIG. 6, the chemical agent supply pipe 38 is connected as a chemical agent supply means to the raw water supply pipe 26 at a position upstream from the pump 18. The chemical agent supply pipe 38 may also be connected to the raw water tank 10 as a chemical agent supply means.

The raw water that represents the water to be treated containing organic substance passes through the raw water pipe 24, and following storage in the raw water tank 10 where necessary, is fed through the raw water supply pipe 26 by the pump 18 and supplied to the membrane filtration device 12. In the membrane filtration device 12, insoluble components are removed from the water being treated by a separation membrane (prefiltration treatment step). Here, the cleaning chemical agent passes through the chemical agent supply pipe 38 and is supplied to the raw water, in either the raw water supply pipe 26 at a position upstream from the pump 18, or in the raw water tank 10 (chemical agent supply step), and the separation membrane and the like of the membrane filtration device 12 is then cleaned using the raw water containing the chemical agent.

In a similar manner to the filtration treatment system 1 of FIG. 1, the prefiltration-treated water that has undergone prefiltration treatment is subjected to a reverse osmosis membrane treatment using a reverse osmosis membrane in the reverse osmosis membrane treatment device 16 (reverse osmosis membrane treatment step). When cleaning of the membrane filtration device 12 becomes necessary, at least a portion of the prefiltration-treated water from the prefiltration-treated water tank 14 is supplied as a backwash water to the secondary side of the membrane filtration device 12, and backwashing is performed (backwash step).

An embodiment in which a stabilized hypobromous acid composition is added as a chemical agent to the raw water that represents the water being treated by the prefiltration treatment means offers the advantages that slime generation in the prefiltration treatment means is inhibited, slime generation on the polyamide reverse osmosis membrane in a subsequent stage can be inhibited with almost no degradation of the reverse osmosis membrane, and additional facilities such as a reducing agent addition means or an activated carbon device or the like may not be provided in a stage prior to the reverse osmosis membrane treatment means.

In the filtration treatment method and the filtration treatment system according to embodiments of the present invention, a chemical agent including a bromine-based oxidizing agent, or a reaction product of a bromine compound and a chlorine-based oxidizing agent, and a sulfamic acid compound, or alternatively, including a reaction product of a sulfamic acid compound with a bromine-based oxidizing agent, or with a reaction product of a bromine compound and a chlorine-based oxidizing agent is added to at least one of the raw water and the backwash water, and if necessary also to the chemical solution of a chemical agent cleaning step, for the purpose of preventing blockages and inhibiting slime generation in the membrane filtration device 12 that functions as the prefiltration treatment means, or as a chemical agent for cleaning that is used in the chemical agent cleaning step.

In other words, in the filtration treatment method and the filtration treatment system according to embodiments of the present invention, a chemical agent is used that includes a "bromine-based oxidizing agent" or a "reaction product of a bromine compound and a chlorine-based oxidizing agent" and a "sulfamic acid compound". As a result, it is thought that a stabilized hypobromous acid composition is produced in at least one of the raw water and the backwash water, and also in the chemical solution used in the chemical agent cleaning step.

Furthermore, in the filtration treatment method and the filtration treatment system according to embodiments of the present invention, a stabilized hypobromous acid composition that is a "reaction product of a sulfamic acid compound with a bromine-based oxidizing agent" or "a reaction product of a sulfamic acid compound with a reaction product of a bromine compound and a chlorine-based oxidizing agent" may be supplied as the aforementioned chemical agent.

In particular, in the filtration treatment method and the filtration treatment system according to an embodiment of the present invention, "bromine", "bromine chloride" or a "reaction product of sodium bromide and hypochlorous acid", and a "sulfamic acid compound" are supplied to at least one of the raw water and the backwash water, and also to the chemical solution used in the chemical agent cleaning step.

Further, in another example of the filtration treatment method and the filtration treatment system according to an embodiment of the present invention, a "reaction product of a sulfamic acid compound with bromine", a "reaction product of a sulfamic acid compound with bromine chloride" or "a reaction product of a sulfamic acid compound with a reaction product of sodium bromide and hypochlorous acid" is supplied to at least one of the raw water and the backwash water, and also to the chemical solution used in the chemical agent cleaning step.

For example, a "bromine-based oxidizing agent" or a "reaction product of a bromine compound and a chlorine-based oxidizing agent" and a "sulfamic acid compound", or alternatively a reaction product of these components, may be injected into the backwash water in the backwash water pipe 36 using a chemical feed pump or the like. The "bromine-based oxidizing agent" or the "reaction product of a bromine compound and a chlorine-based oxidizing agent" and the "sulfamic acid compound" may be added separately, or the neat liquids may be mixed together and then added.

Alternatively, the "bromine-based oxidizing agent" or the "reaction product of a bromine compound and a chlorine-based oxidizing agent" and the "sulfamic acid compound", or alternatively a reaction product of these components, may be injected into the raw water in the raw water tank 10 or the raw water supply pipe 26 using a chemical feed pump or the like.

A chemical agent cleaning step in which the separation membrane and the like of the membrane filtration device 12 are immersed in a chemical solution containing a chemical agent may also be provided periodically. This chemical agent cleaning step includes a removal step of immersing the separation membrane and the like in a chemical solution containing a chemical agent to dissolve or remove impurities adhered to the separation membrane and the like, and a flushing step of washing away any chemical agent retained inside the membrane filtration device 12 with a flushing liquid such as water.

In this case, the "bromine-based oxidizing agent" or the "reaction product of a bromine compound and a chlorine-based oxidizing agent" and the "sulfamic acid compound", or the reaction product of these components, which is injected into the backwash water in the backwash water pipe 36 using a chemical feed pump or the like, may be used as the above chemical solution.

In the filtration treatment method and the filtration treatment system according to the present embodiment, by ensuring that the "bromine-based oxidizing agent" or the "reaction product of a bromine compound and a chlorine-based oxidizing agent" and the "sulfamic acid compound", or the reaction product of these components, exist in at least one of the raw water and the backwash water, and also in the chemical solution used in the chemical agent cleaning step, blockages can be prevented and slime generation can be inhibited in the membrane filtration device 12. Because the stabilized hypobromous acid composition may cause almost no degradation of the reverse osmosis membrane, the addition of a reducing agent or installation of an activated carbon column or the like in a stage prior to the reverse osmosis membrane treatment is unnecessary, and an additional slime control agent may not be added at a stage prior to the reverse osmosis membrane treatment, meaning the system can be simplified.

Further, a flushing step may not be performed in the chemical agent cleaning step for the membrane filtration device 12, and even if the supply of raw water is recommenced after washing with only an extremely small amount of flushing liquid, the reverse osmosis membrane in the subsequent stage suffers almost no degradation, meaning the process can be simplified and the amount of backwash wastewater can be reduced.

The ratio of the equivalent weight of the "sulfamic acid compound" relative to the equivalent weight of the "bromine-based oxidizing agent" or the "reaction product of a bromine compound and a chlorine-based oxidizing agent" is preferably 1 or greater, and is more preferably within a range from at least 1 to not more than 2. If the ratio of the equivalent weight of the "sulfamic acid compound" relative to the equivalent weight of the "bromine-based oxidizing agent" or the "reaction product of a bromine compound and a chlorine-based oxidizing agent" is less than 1, then there is a possibility that the active components may not stabilize satisfactorily, whereas if the ratio exceeds 2, then the production costs may sometimes increase.

The effective halogen concentration contacting the separation membrane, calculated as an effective equivalent chlorine concentration, is preferably from 0.01 to 100 mg/L. If this concentration is less than 0.01 mg/L, then a satisfactory slime inhibitory effect may not be obtainable, whereas if the concentration is greater than 100 mg/L, then there is a possibility that corrosion of metal materials such as the pipes may occur.

Examples of the bromine-based oxidizing agent include bromine (liquid bromine), bromine chloride, hypobromous acid, bromic acid, and bromate salts and the like.

Among these, compared with a formulation of "hypochlorous acid, a bromine compound and sulfamic acid" or a formulation of "bromine chloride and sulfamic acid" or the like, formulations that use bromine such as "bromine and a sulfamic acid compound" or a "reaction product of bromine and a sulfamic acid compound" are preferred, as they tend to contain less chloride ions, and are less likely to cause corrosion of metal materials such as the pipes.

In other words, the filtration treatment method and the filtration treatment system according to embodiments of the present invention preferably incorporate bromine and a sulfamic acid compound, or incorporate a reaction product of bromine and a sulfamic acid compound, in at least one of the raw water and the backwash water, and also in the chemical solution of the chemical agent cleaning step.

Examples of the bromine compound include sodium bromide, potassium bromide, lithium bromide and hydrobromic acid. Among these, in terms of production costs and the like, sodium bromide is preferred.

Examples of the chlorine-based oxidizing agent include chlorine gas, chlorine dioxide, hypochlorous acid or salts thereof, chlorous acid or salts thereof, chloric acid or salts thereof, perchloric acid or salts thereof, and chlorinated isocyanuric acid or salts thereof. Among these, examples of the salts include alkali metal salts of hypochlorous acid such as sodium hypochlorite and potassium hypochlorite, alkaline earth metal salts of hypochlorous acid such as calcium hypochlorite and barium hypochlorite, alkali metal salts of chlorous acid such as sodium chlorite and potassium chlorite, alkaline earth metal salts of chlorous acid such as barium chlorite, other metal salts of chlorous acid such as nickel chlorite, ammonium chlorate, alkali metal salts of chloric acid such as sodium chlorate and potassium chlorate, and alkaline earth metal salts of chloric acid such as calcium chlorate and barium chlorate. Any one of these chlorine-based oxidizing agents may be used alone, or a combination of two or more oxidizing agents may be used. In terms of ease of handling and the like, the use of sodium hypochlorite as the chlorine-based oxidizing agent is preferred.

The sulfamic acid compound is a compound represented by general formula (1) shown below.

$$R_2NSO_3H \tag{1}$$

(In the formula, each R independently represents a hydrogen atom or an alkyl group having a carbon number of 1 to 8.)

Examples of the sulfamic acid compound, in addition to sulfamic acid (amidosulfuric acid) in which the two R groups are both hydrogen atoms, include sulfamic acid compounds in which one of the two R groups is a hydrogen atom and the other is an alkyl group having a carbon number of 1 to 8, such as N-methylsulfamic acid, N-ethylsulfamic acid, N-propylsulfamic acid, N-isopropylsulfamic acid and N-butylsulfamic acid, sulfamic acid compounds in which the two R groups are both alkyl groups having a carbon number of 1 to 8, such as N,N-dimethylsulfamic acid, N,N-diethylsulfamic acid, N,N-dipropylsulfamic acid, N,N-dibutylsulfamic acid, N-methyl-N-ethylsulfamic acid and N-methyl-N-propylsulfamic acid, and sulfamic acid compounds in which one of the two R groups is a hydrogen atom and the other is an aryl group having a carbon number of 6 to 10, such as N-phenylsulfamic acid, as well as salts of the above acids. Examples of the sulfamic acid salts include alkali metal salts such as sodium salts and potassium salts, alkaline earth metal salts such as calcium salts, strontium salts and barium salts, other metal salts such as manganese salts, copper salts, zinc salts, iron salts, cobalt salts and nickel salts, as well as ammonium salts and guanidine salts. One of these sulfamic acid compounds or salts may be used alone, or a combination of two or more compounds or salts may be used. In terms of the environmental burden and the like, the use of sulfamic acid (amidosulfuric acid) as the sulfamic acid compound is preferred.

In the filtration treatment method and the filtration treatment system according to embodiments of the present invention, an alkali is preferably also included. Examples of the alkali include alkali hydroxides such as sodium hydroxide and potassium hydroxide. In terms of achieving good product stability at low temperatures, and the like, a combination of sodium hydroxide and potassium hydroxide may also be used. The alkali is typically used not as a solid, but in the form of an aqueous solution.

Examples of the separation membrane of the membrane filtration device 12 include a nanofiltration membrane (NF membrane), microfiltration membrane (MF membrane), and ultrafiltration membrane (UF membrane).

Further, other examples of the prefiltration treatment means besides membrane filtration devices include sand filtration devices and the like.

The filtration treatment method and the filtration treatment system according to embodiments of the present invention can be applied particularly favorably to polyamide-based polymer membranes, which are currently the most widely used reverse osmosis membranes (RO membranes). Polyamide-based polymer membranes have comparatively low resistance to oxidizing agents, and if free chlorine or the like is kept in continuous contact with a polyamide-based polymer membrane, then a marked deterioration may occur in the performance of the membrane. However, in the filtration treatment method and the filtration treatment system according to embodiments of the present invention, this type of marked deterioration in the membrane performance is almost non-existent, even for polyamide polymer membranes.

In the filtration treatment method and the filtration treatment method according to embodiments of the present invention, the pH of the raw water that represents the water to be treated is preferably 5.5 or higher, more preferably 6.0 or higher, and even more preferably 6.5 or higher. If the pH of the raw water is less than 5.5, then the pH of the feed water (prefiltration-treated water) supplied to the reverse osmosis membrane treatment device 16 may fall to less than 5.5, and the volume of permeate may sometimes decrease. Further, there are no particular limitations on the upper limit for the pH of the raw water, provided that the pH is no higher than the typical upper limit pH for reverse osmosis membrane devices (for example, pH 10), but if scale deposition of hard components such as calcium is also considered, then performing operations at a pH of, for example, 9.0 or lower is preferred. When the filtration treatment method and the filtration treatment system according to embodiments of the present invention are used, by performing operations with the pH of the raw water set to 5.5 or higher, degradation of the reverse osmosis membrane of the reverse osmosis membrane treatment device 16 and deterioration in the quality of the treated water (permeate) can be suppressed, a satisfactory slime inhibitory effect can be achieved, and a satisfactory permeate volume can also be ensured.

Further, if the pH of the raw water supplied to the membrane filtration device 12 that functions as the prefiltration treatment means is less than 5.0, then the retention rate of the stabilized hypobromous acid upon passage through the membrane filtration device 12 may sometimes fall. It is thought that this is because if the pH of the raw water is less than 5.0, then the stabilized hypobromous acid may react with the membrane of the membrane filtration device 12, and is therefore slightly more likely to be consumed. The details behind this reasoning are unclear, but it is thought that there is a possibility that the pH of the raw water falling to less than 5.0 may cause a relative increase in the proportion of molecular hypobromous acid within the stabilized hypobromous acid, resulting in increased oxidizing power.

On the other hand, when the pH of the raw water supplied to the membrane filtration device 12 that functions as the prefiltration treatment means is 5.0 or higher, the retention rate of the stabilized hypobromous acid upon passage through the membrane filtration device 12 may increase, and therefore the pH of the raw water is preferably at least 5.0, and is more preferably 6.5 or higher.

If the effect on the permeate volume from the reverse osmosis membrane treatment device 16 downstream from the membrane filtration device 12 is also considered, then the pH of the raw water supplied to the membrane filtration device 12 that functions as the prefiltration treatment means is preferably 5.5 or higher, and a raw water pH of 6.5 or higher is even more preferred. This enables consumption of the stabilized hypobromous acid in the membrane filtration device 12 to be suppressed, degradation of the reverse osmosis membrane of the downstream reverse osmosis membrane treatment device 16 to also be suppressed, and slime generation to be inhibited, while also suppressing any reduction in the permeate volume from the reverse osmosis membrane treatment device 16.

In the reverse osmosis membrane treatment device 16, in those cases where scale develops when the pH of the prefiltration-treated supplied to the reverse osmosis membrane treatment device 16 is 5.5 or higher, a dispersant may be used in combination with the stabilized hypobromous acid composition for the purpose of scale inhibition. Examples of the dispersant include polyacrylic acid, polymaleic acid and phosphonic acid. The amount of the dispersant added to the feed water (prefiltration-treated water), for example in terms of the concentration within the concentrate, is typically within a range from 0.1 to 1,000 mg/L.

Further, one method for inhibiting the occurrence of scale without using a dispersant involves adjusting the operating conditions for the reverse osmosis membrane treatment device 16 such as the recovery rate so that the silica concentration in the concentrate is no higher than the degree of solubility, and the Langelier index, which is an indicator for calcium scale, is not more than 0.

The filtration treatment method and the filtration treatment system according to embodiments of the present invention are used for treating water containing organic substance, such as wastewater from semiconductor plants or wastewater from liquid crystal plants. The TOC of the water to be treated is typically within a range from 0.1 mg/L to 10 mg/L, for example. Further, the turbidity of the water to be treated is typically within a range from 0.1 to 10 degrees, for example.

<Composition for Filtration Treatment>

A composition for a filtration treatment according to an embodiment of the present invention is a composition including a "bromine-based oxidizing agent" or a "reaction product of a bromine compound and a chlorine-based oxidizing agent" and a "sulfamic acid compound", and may also include an alkali.

Further, the composition for a filtration treatment according to the present embodiment may also be a composition including a "reaction product of a bromine-based oxidizing agent and a sulfamic acid compound" or a "reaction product of a sulfamic acid compound with a reaction product of a bromine compound and a chlorine-based oxidizing agent", and may also include an alkali.

The bromine-based oxidizing agent, the bromine compound, the chlorine-based oxidizing agent, and the sulfamic acid compound are as described above.

In terms of minimizing corrosion of metal materials such as pipes and minimizing the production of by-products such as bromic acid, the composition for a filtration treatment according to the present embodiment preferably includes bromine and a sulfamic acid compound, or a reaction product of bromine and a sulfamic acid compound.

Compared with combined chlorine-based slime inhibitors such as chlorosulfamic acid, the composition for a filtration treatment according to the present embodiment may have higher oxidizing power, and markedly higher slime inhibition and slime-detaching power.

Unlike other oxidizing agents such as hypochlorous acid, the composition for a filtration treatment according to the present embodiment may cause almost no degradation of the reverse osmosis membrane. Further, because the concentration can be measured on site in a similar manner to hypochlorous acid or the like, more accurate concentration control is possible.

The pH of the composition is, for example, higher than 13.0, and is preferably higher than 13.2. If the pH of the composition is 13.0 or lower, then the effective halogen in the composition may sometimes become unstable.

The bromate concentration in the composition for a filtration treatment is preferably less than 5 mg/kg. If the bromate concentration in the composition for a filtration treatment is 5 mg/kg or greater, then the water quality of the treated water may deteriorate.

<Method for Producing Composition for Filtration Treatment>

The composition for a filtration treatment according to an embodiment of the present invention can be obtained by mixing a bromine-based oxidizing agent and a sulfamic acid compound, or by mixing a reaction product of a bromine compound and a chlorine-based oxidizing agent, and a sulfamic acid compound. An alkali may also be mixed into the composition.

The method for producing a composition for a filtration treatment that includes bromine and a sulfamic acid compound, or a composition for a filtration treatment that includes a reaction product of bromine and a sulfamic acid compound, preferably includes a step of adding and reacting bromine, under an inert gas atmosphere, with a mixed solution including water, an alkali and a sulfamic acid compound. Performing the addition and inducing the reaction under an inert gas atmosphere enables the concentration of bromate ions in the composition to be reduced, which is preferred.

Although there are no particular limitations on the inert gas used, at least one of nitrogen and argon is preferred from a production perspective and the like, and nitrogen is particularly preferred in terms of production costs and the like.

The oxygen concentration inside the reaction vessel during the bromine addition is preferably not more than 6%, more preferably not more than 4%, even more preferably not more than 2%, and most preferably 1% or less. If the oxygen concentration inside the reaction vessel during the bromine reaction exceeds 6%, then the amount of bromic acid produced in the reaction system may sometimes increase.

The proportion of bromine added is preferably not more than 25 wt % relative to the total weight of the composition, and is more preferably at least 1 wt % but not more than 20 wt %. If the proportion of bromine added exceeds 25 wt % relative to the total weight of the composition, then the amount of bromic acid produced in the reaction system may sometimes increase. If the proportion is less than 1 wt %, then the sterilizing power may deteriorate.

The reaction temperature during the bromine addition is preferably controlled within a range from at least 0° C. to not more than 25° C., and in terms of production costs and the like, is more preferably controlled within a range from at least 0° C. to not more than 15° C. If the reaction temperature during the bromine addition exceeds 25° C., then the amount of bromic acid produced in the reaction system may sometimes increase, whereas if the temperature is less than 0° C., then the reaction system may freeze.

EXAMPLES

The present invention is described below in further detail using a series of Examples and Comparative Examples, but the present invention is in no way limited by the following examples.

[Preparation of Stabilized Hypobromous Acid Composition]

Liquid bromine: 16.9 wt %, sulfamic acid: 10.7 wt %, sodium hydroxide: 12.9 wt %, potassium hydroxide: 3.94%, and water: the balance were mixed together under a nitrogen atmosphere to prepare a composition. The pH of the composition was 14, and the effective halogen concentration (effective equivalent chlorine concentration) was 7.5 wt %. A more detailed description of the preparation method for the stabilized hypobromous acid composition is presented below.

A 2 liter four-necked flask into which nitrogen gas was injected continuously at a flow rate controlled by a mass flow controller so that the oxygen concentration inside the reaction vessel was maintained at 1% was charged with 1,436 g of water and 361 g of sodium hydroxide, and following mixing, 300 g of sulfamic acid was added and mixed, and with the flask then cooled to maintain the temperature of the reaction solution at 0 to 15° C., 473 g of liquid bromine was added, and 230 g of a 48% solution of potassium hydroxide was then added, thus obtaining the target composition containing 10.7 wt % of sulfamic acid and 16.9 wt % of bromine relative to the total weight of the composition, and having a ratio for the equivalent weight of sulfamic acid relative to the equivalent weight of bromine of 1.04. Measurement of the pH of the thus prepared solution using the glass electrode method yielded a value of 14. Measurement of the bromine content of the prepared solution using a method in which the bromine was substituted with iodine using potassium iodide, and a redox titration was then performed using sodium thiosulfate revealed a value of 16.9%, which was 100.0% of the theoretical content (16.9%). Further, the oxygen concentration inside the reaction vessel during the bromine reaction was measured using an "Oxygen Monitor JKO-02 LJDII" manufactured by Jikco Ltd. The bromate concentration was less than 5 mg/kg.

[Filtration Treatment]

Using a filtration treatment system 1 having the flow illustrated in FIG. 1, tests were performed in sequence for the following Example 1→Example 2→Comparative Example 1→Comparative Example 2.

(Test Conditions)

Water to be treated: semiconductor plant wastewater
  pH: 6.9 to 7.3
  Conductivity: 340 to 510 μS/cm
  TOC: 0.1 to 0.5 mg/L
  Turbidity: 1 to 10 degrees
Membrane filtration device: ultrafiltration membrane (UF membrane) (formed from polyvinylidene fluoride (PVDF), an external pressure hollow fiber membrane, effective membrane surface area: 4 m$^2$, nominal pore size: 0.01 μm (UNA-620A, manufactured by Asahi Kasei Corporation))
Backwashing: backwash step described below was performed once every 30 minutes
  Air backwash: 50 seconds
  Chemical agent backwash 65 seconds
    (once every 24 hours, the pH of the backwash water during the 65-second chemical agent backwash was adjusted to 10 with NaOH before performing backwashing)
Flushing step: 0 seconds (Example 2), 20 seconds (Example 1, Comparative Example 2), or 110 seconds (Comparative Example 1)
Backwash water flow rate: 6.9 L/min
Reverse osmosis membrane: formed from polyamide, effective surface area: 6.5 m$^2$ (OFR-620, manufactured by Organo Corporation)

Example 1

In Example 1, the membrane filtration system illustrated in FIG. 1 was used, and a continuous operation was performed by repeating a filtration treatment step (prefiltration treatment step→reverse osmosis membrane treatment step)→a backwash step (air backwash→chemical agent backwash)→a flushing step. The flushing step was performed for 20 seconds. The stabilized hypobromous acid composition described above was added as the chemical agent for the chemical agent cleaning, in an amount sufficient to produce an effective halogen concentration (effective equivalent chlorine concentration) within the backwash water of 5 mg/L.

Example 2

With the exception of omitting the flushing step, operations were performed in the same manner as Example 1.

Comparative Example 1

In Comparative Example 1, instead of using the aforementioned stabilized hypobromous acid composition used in Example 1 as the chemical agent for the chemical agent cleaning, a hypochlorous acid aqueous solution was added to the backwash water in an amount sufficient to produce an effective chlorine concentration of 5 mg/L, and then a continuous operation was performed by repeating a filtration treatment step (prefiltration treatment step→reverse osmosis membrane treatment step)→a backwash step (air backwash→chemical agent backwash)→a flushing step. The flushing step was performed for 110 seconds.

Comparative Example 2

With the exception of shortening the time of the flushing step to 20 seconds, operations were performed in the same manner as Comparative Example 1.

Figure 3:
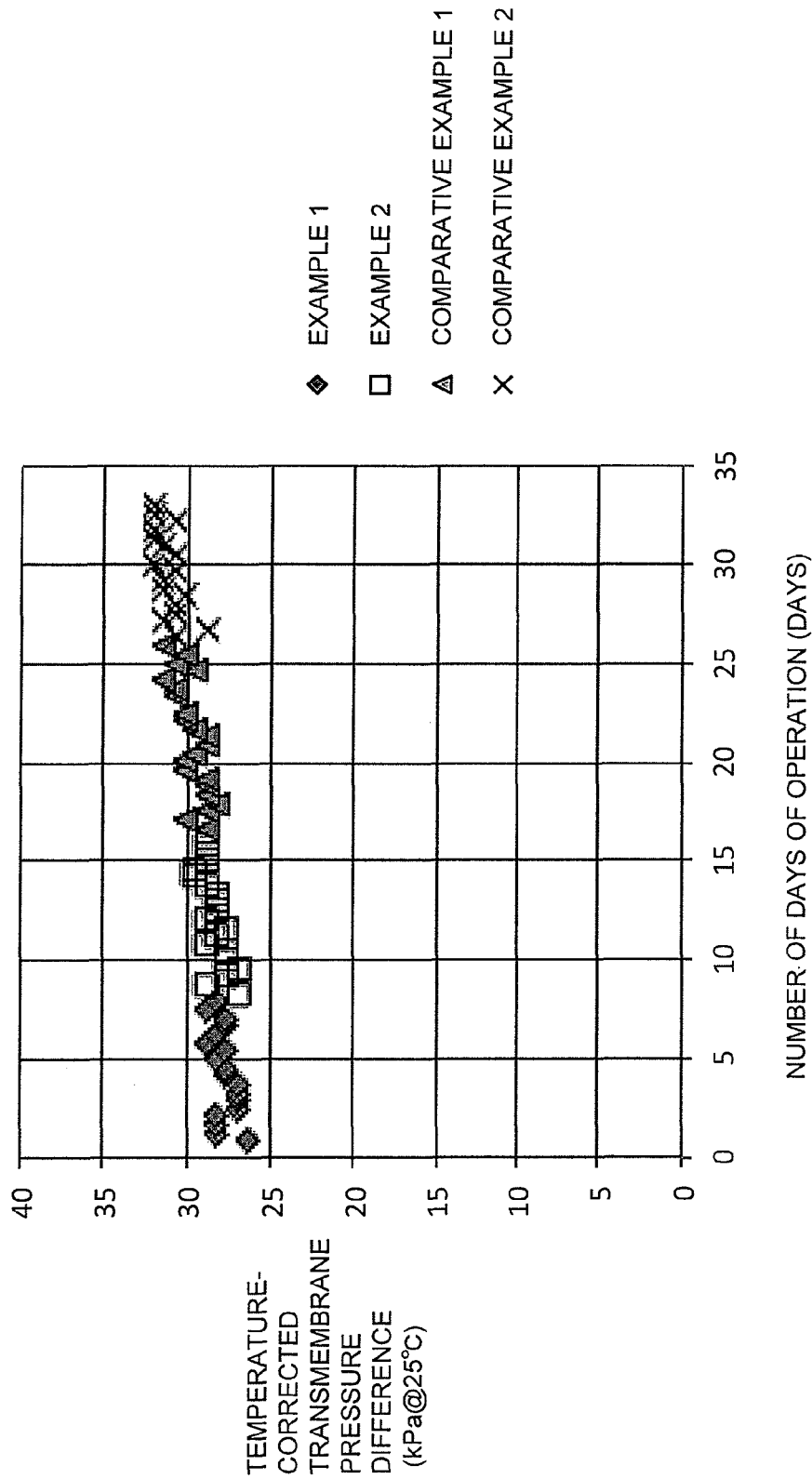
FIG. 3 is a diagram illustrating the temperature-corrected transmembrane pressure difference (kPa @ 25° C.) for an ultrafiltration membrane relative to the number of days of operation in the Examples and Comparative Examples.
Figure 4:
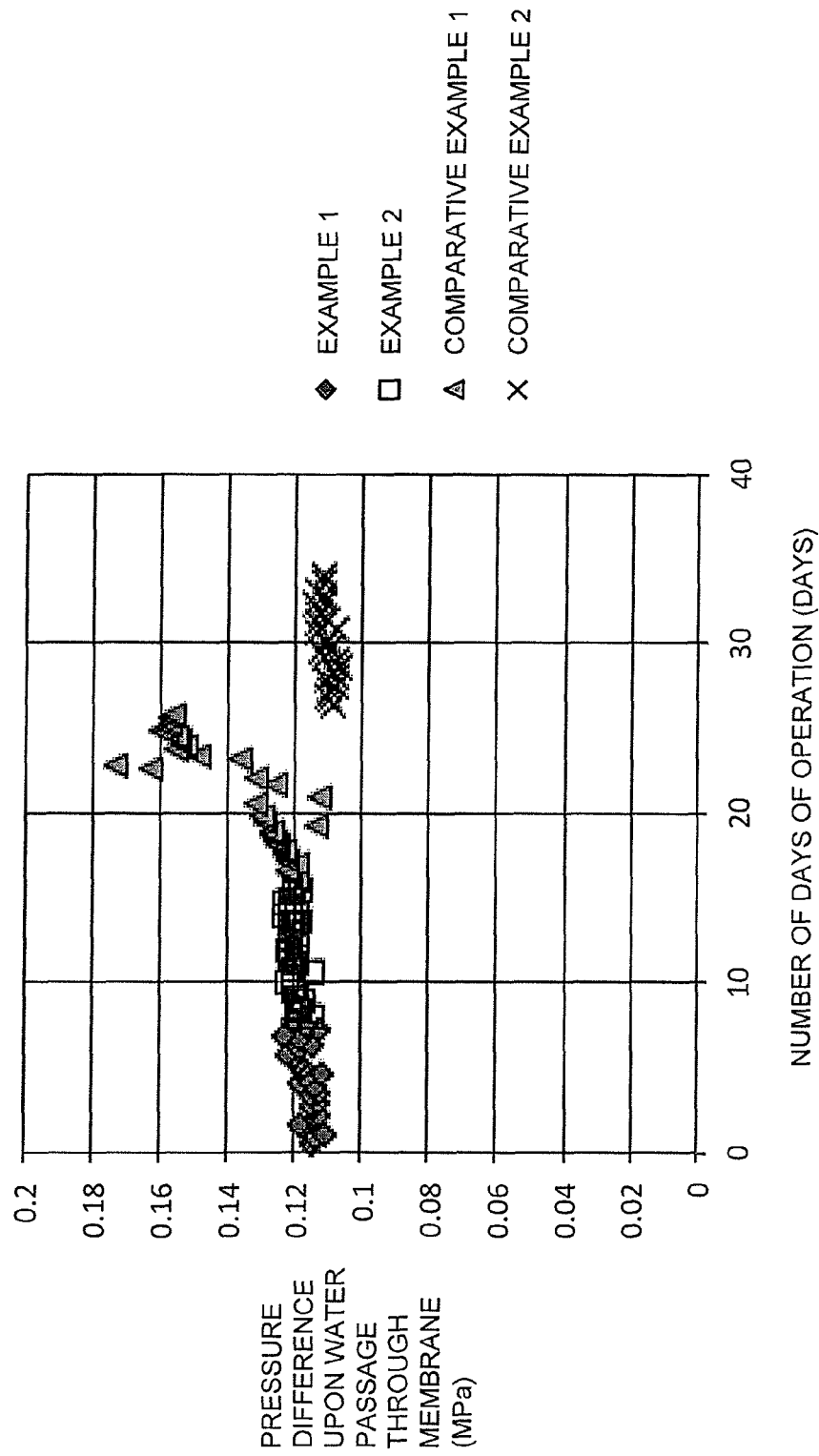
FIG. 4 is a diagram illustrating the pressure difference (MPa) upon water passage through a reverse osmosis membrane relative to the number of days of operation in the Examples and Comparative Examples.
Figure 5:
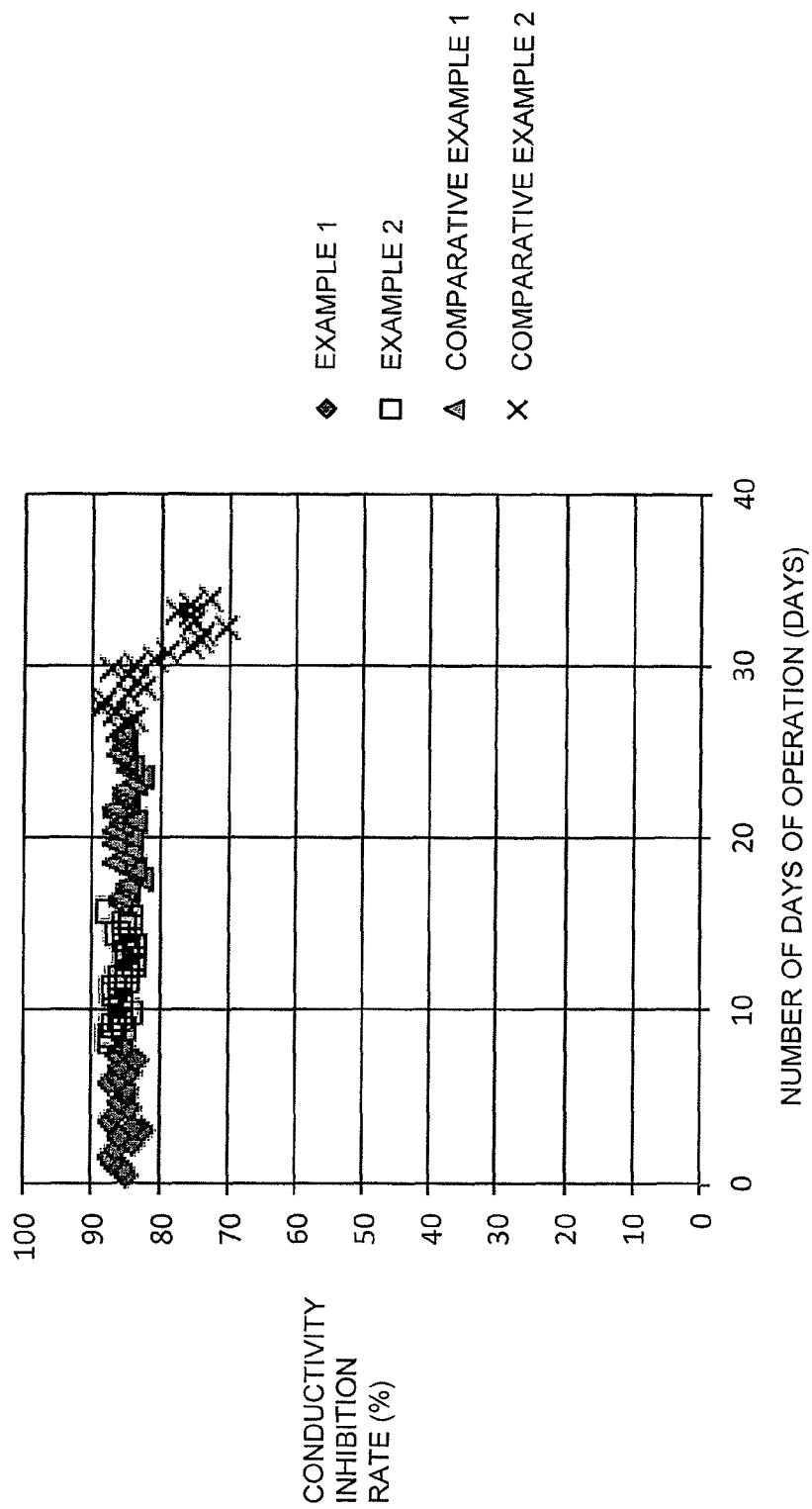
FIG. 5 is a diagram illustrating the conductivity inhibition rate (%) for a reverse osmosis membrane relative to the number of days of operation in the Examples and Comparative Examples.

The operational results for the Examples and Comparative Examples are shown in FIG. 3 to FIG. 5 and Table 1.

Based on FIG. 3, it is evident that under each of the conditions, operations were able to be performed with good stability, with no dramatic increase in the transmembrane pressure difference for the UF membrane of the prefiltration treatment.

Based on FIG. 4, it is evident that in both Examples 1 and 2, operations were able to be performed with good stability, with no dramatic increase in the pressure difference upon water passage through the reverse osmosis membrane being observed. Based on FIG. 5, it is evident that in both Examples 1 and 2, the inhibition rate for the reverse osmosis membrane was able to be maintained at a high level. Moreover, based on Table 1, it is clear that the amount of backwash wastewater in Example 2 was minimal compared with the Comparative Examples.

In contrast, based on FIG. 4, it is evident that in Comparative Example 1, because the antibacterial agent concentration at the reverse osmosis membrane was low, slime was generated and the pressure difference upon water passage through the membrane increased. Further, the amount of backwash wastewater was large. As a result, the reverse osmosis membrane was replaced after the test of Comparative Example 1.

Further, based on FIG. 5, it is evident that in Comparative Example 2, the reverse osmosis membrane was degraded by chlorine, with a decreasing trend observed for the inhibition rate for the reverse osmosis membrane.

TABLE 1

|  | Example 1 | Example 2 | Comparative Example 1 | Comparative Example 2 |
|---|---|---|---|---|
| Backwash chemical agent | Stabilized hypobromous acid | Stabilized hypobromous acid | Hypochlorous acid | Hypochlorous acid |
| Flushing step time [sec] | 20 | 0 | 110 | 20 |
| Washing wastewater halogen concentration [mg/L] | 0.2 | 5 | <0.1 | 0.2 |
| Chemical agent backwash wastewater volume [L/repetition] | 2.3 | 0 | 12.7 | 2.3 |

In this manner, by supplying a chemical agent containing a stabilized hypobromous acid composition to at least one of the raw water and the backwash water as in the Examples, the steps were able to be simplified and the amount of washing wastewater was able to be reduced in a filtration treatment in which a water to be treated containing organic substance was subjected to a prefiltration treatment followed by a reverse osmosis membrane treatment.

[Comparative Tests on the Effects of pH of Feed Water Supplied to RO Device on Permeate Volume and Membrane Rejection Rate]

The effects of the pH of the feed water supplied to the RO device on the permeate volume and the membrane rejection rate were compared.

(Test Conditions)
  Test device: flat membrane test device
  Separation membrane: polyamide-based polymer reverse osmosis membrane ES20, manufactured by Nitto Denko Corporation
  Operating pressure: 0.75 MPa
  Raw water: Sagamihara well water (pH: 7.2, conductivity: 240 μS/cm)
  Chemical agent: the stabilized hypobromous acid composition prepared in the manner described above was added in sufficient amount to produce an effective halogen concentration (effective equivalent chlorine concentration) of 1 mg/L (measurement method for effective halogen concentration: measured by the DPD method using a residual chlorine measuring instrument (DR-4000, manufactured by Hach Company))
  RO membrane feed water: pH 4.0 (Example 3-1), 5.0 (Example 3-2), 5.5 (Example 3-3), 6.0 (Example 3-4), 6.5 (Example 3-5), 7.0 (Example 3-6), 7.5 (Example 3-7), 8.0 (Example 3-8), 8.5 (Example 3-9), 9.0 (Example 3-10)
(Evaluation Methods)
  Effect on RO membrane rejection rate: the conductivity inhibition rate (%) after 120 hours of water passage through the membrane (100−[permeate conductivity/feed water conductivity]×100)

Effect on permeate volume: the retention rate of the permeate volume (%, relative to initial volume) after 24 hours of water passage through the membrane
The test results are shown in Table 2.

TABLE 2

| | pH of RO membrane feed water | RO membrane permeate volume retention rate (after 24 hours water passage) (%, relative to initial volume) | RO membrane rejection rate (after 120 hours water passage) (%) |
|---|---|---|---|
| Example 3-1 | 4.0 | 44 | 99 |
| Example 3-2 | 5.0 | 57 | 99 |
| Example 3-3 | 5.5 | 80 | 99 |
| Example 3-4 | 6.0 | 94 | 99 |
| Example 3-5 | 6.5 | 97 | 99 |
| Example 3-6 | 7.0 | 97 | 99 |
| Example 3-7 | 7.5 | 97 | 99 |
| Example 3-8 | 8.0 | 97 | 99 |
| Example 3-9 | 8.5 | 99 | 99 |
| Example 3-10 | 9.0 | 99 | 99 |

In Examples 3-1 to 3-10, no deterioration in the rejection rate was observed, indicating good suppression of any degradation of the RO membrane (RO membrane rejection rate after 120 hours of 99% or higher). In particular, in Examples 3-3 to 3-10, no significant reduction in the permeate volume was observed (the RO membrane permeate volume was retained at 80% or more of the original volume after 24 hours water passage). In contrast, in Examples 3-1 and 3-2, although no deterioration in the rejection rate was observed, indicating good suppression of RO membrane degradation, the permeate volume decreased. Based on these results, it was clear that in order to maintain the permeate volume for the RO membrane, while inhibiting slime generation on the RO membrane, the pH of the water to be treated by the RO membrane (namely, the prefiltration-treated water) is preferably adjusted to 5.5 or higher.

Example 4

In Example 4, the membrane filtration system illustrated in FIG. 6 was used, and continuous operation of a filtration treatment step (prefiltration treatment step→reverse osmosis membrane treatment step) was performed. The stabilized hypobromous acid composition prepared using the method described above was added to the water to be treated (the raw water) in the prefiltration treatment step as a chemical agent, in an amount sufficient to produce an effective halogen concentration (effective equivalent chlorine concentration) of 10 mg/L.
(Test Conditions)
  Raw water: washing wastewater
  pH: 6.5
  Conductivity: 2400/cm
  TOC: 0.1 mg/L
  Turbidity: <1 degree
  Prefiltration treatment device (membrane filtration device): ultrafiltration membrane (UF membrane) (an external pressure hollow fiber membrane formed from polyether sulfone (PES)(FS10-FS-FUST653, manufactured by Daicen Membrane Systems Ltd.), effective membrane surface area: 7.8 m$^2$, nominal pore size: 0.5 μm), supply pressure: 0.2 MPa, raw water supply rate: 15 t/h
  Reverse osmosis membrane treatment device: reverse osmosis membrane (RO membrane) (polyamide-based polymer reverse osmosis membrane ES20, manufactured by Nitto Denko Corporation), supply pressure: 0.6 MPa, recovery rate: 75%
  Water passage time: 30 days
(Test Results)
  The concentration of the stabilized hypobromous acid composition was substantially the same before and after passage through the prefiltration treatment device (effective halogen concentration (effective equivalent chlorine concentration) of 10 mg/L), confirming that almost none of the composition was consumed in the prefiltration treatment device portion. Further, no slime generation was observed in the prefiltration treatment device.
  Furthermore, in the reverse osmosis membrane device (RO device) positioned downstream from the prefiltration treatment device, no reduction in the permeate volume, degradation of the reverse osmosis membrane, or slime generation was observed, and a favorable treatment was able to be conducted.
[Retention Rate of Stabilized Hypobromous Acid Composition Relative to pH of Raw Water Supplied to Prefiltration Treatment Device]
  A comparative test was performed to determine whether differences in the retention rate of the stabilized hypobromous acid composition upon passage through the prefiltration treatment device could be observed upon changing in the pH of the raw water supplied to the prefiltration treatment device. The results are shown in Table 3.
(Test Conditions)
  Prefiltration treatment device: ultrafiltration membrane (UF membrane) (a disc filter formed from polyvinylidene fluoride (PVDF) (Millex VV, manufactured by Millipore Corporation, nominal pore size: 0.1 μm)
  Raw water: pure water (adjusted to the appropriate pH by adding hydrochloric acid)

Chemical agent: the stabilized hypobromous acid composition prepared using the method described above was added to the raw water in sufficient amount to produce an effective halogen concentration (effective equivalent chlorine concentration) of 00 mg/L (measurement method for effective halogen concentration: measured by the DPD method using a residual chlorine measuring instrument (DR-4000, manufactured by Hach Company))

TABLE 3

| Raw water pH | Stabilized hypobromous acid composition retention rate upon passage through ultrafiltration membrane (%) |
|---|---|
| 4.0 | 89.1 |
| 5.0 | 94.2 |
| 5.5 | 94.2 |
| 6.5 | 96.4 |

Based on Table 3, it was evident that when the pH of the raw water supplied to the prefiltration treatment device fell to less than 5.0, the retention rate of the stabilized hypobromous acid composition upon passage through the prefiltration treatment device decreased slightly. It is thought that this is because as the pH of the raw water falls to less than 5.0, the stabilized hypobromous acid may react with the ultrafiltration membrane, and is therefore slightly more likely to be consumed. The details behind this reasoning are unclear, but it is thought that there is a possibility that the pH of the raw water falling to less than 5.0 may cause a relative increase in the proportion of molecular hypobromous acid within the stabilized hypobromous acid, resulting in increased oxidizing power.

On the other hand, based on the fact that the retention rate of the stabilized hypobromous acid composition upon passage through the prefiltration treatment device increased when the pH of the raw water supplied to the prefiltration treatment device was 5.0 or higher, it was clear that the pH of the raw water is preferably 5.0 or higher, and more preferably 6.5 or higher.

If the effect on the permeate volume from the reverse osmosis membrane treatment device downstream from the prefiltration treatment device is also considered, then the pH of the raw water supplied to the prefiltration treatment device is preferably 5.5 or higher, and a raw water pH of 6.5 or higher is even more preferred. This enables consumption of the stabilized hypobromous acid in the pretreatment filtration device to be suppressed, degradation of the reverse osmosis membrane of the downstream reverse osmosis membrane treatment device to also be suppressed, and slime generation to be inhibited, while also suppressing any reduction in the permeate volume from the reverse osmosis membrane treatment device.

REFERENCE SIGNS LIST 1, 3: Filtration treatment system
10, 50: Raw water tank
12, 52: Membrane filtration device
14, 54: Prefiltration-treated water tank
16, 56: Reverse osmosis membrane treatment device
18, 20, 22: Pump
24: Raw water pipe
26: Raw water supply pipe
28: Prefiltration-treated water pipe
30: Prefiltration-treated water supply pipe
32: Concentrate pipe
34: Permeate pipe
36: Backwash water pipe
38: Chemical agent supply pipe
40: Backwash wastewater pipe
58: Activated carbon column
60: Activated carbon-treated water tank

The invention claimed is:

1. A filtration treatment system comprising:
a prefiltration treatment filter comprising a filter media for removing insoluble components from a water to be treated that contains organic substance,
a reverse osmosis membrane for subjecting a prefiltration-treated water from the prefiltration treatment filter to a reverse osmosis membrane treatment using a polyamide-based polymer membrane, and
a chemical agent supply pipe for supplying a chemical agent to water to be treated by the prefiltration treatment filter, wherein
the chemical agent comprises:
a) a mixture of a bromine-based oxidizing agent and a sulfamic acid compound,
b) a mixture of a sulfamic acid compound and a reaction product of a bromine compound with a chlorine-based oxidizing agent,
c) a reaction product of a sulfamic acid compound with a bromine-based oxidizing agent, or
d) a reaction product of a sulfamic acid compound with a reaction product of a bromine compound with a chlorine-based oxidizing agent;
wherein the prefiltration-treated water from the prefiltration treatment filter comprises the chemical agent;
wherein the chemical agent is added at a point upstream of the pretreatment filter; and
wherein slime generation in the prefiltration treatment filter is inhibited, and slime generation in or on the reverse osmosis membrane is inhibited.

2. The filtration treatment system according to claim 1, wherein
the chemical agent either comprises bromine and a sulfamic acid compound, or comprises a reaction product of bromine and a sulfamic acid compound.

3. The filtration treatment system according to claim 2, wherein
the chemical agent is obtained by a method which includes adding and reacting bromine, under an inert gas atmosphere, with a mixed solution comprising water, an alkali and a sulfamic acid compound.

4. The filtration treatment system according to claim 1, wherein a pH of the prefiltration-treated water is 5.5 or higher.

5. The filtration treatment system according to claim 1, wherein a pH of the water to be treated that is supplied to the prefiltration treatment filter is 5.5 or higher.

6. A filtration treatment method comprising:
a prefiltration in which insoluble components are removed from a water to be treated that contains organic substance,
a reverse osmosis membrane contacting in which a prefiltration-treated water from the prefiltration is subjected to a reverse osmosis membrane contacting using a polyamide-based polymer membrane, and
supplying a chemical agent to water to be treated by a prefiltration treatment filter at a point upstream of the pretreatment filter, wherein the chemical agent comprises;
a) a mixture of a bromine-based oxidizing agent and a sulfamic acid compound,
b) a mixture of a sulfamic acid compound and a reaction product of a bromine compound with a chlorine-based oxidizing agent,
c) a reaction product of a sulfamic acid compound with a bromine-based oxidizing agent, or
d) a reaction product of a sulfamic acid compound with a reaction product of a bromine compound with a chlorine-based oxidizing agent;
wherein the prefiltration-treated water from the prefiltration comprises the chemical agent; and
wherein slime generation in the prefiltration is inhibited, and slime generation in the reverse osmosis membrane contacting is inhibited.

7. The filtration treatment method according to claim 6, wherein
the chemical agent either comprises bromine and a sulfamic acid compound, or comprises a reaction product of bromine and a sulfamic acid compound.

8. The filtration treatment method according to claim 7, wherein
the chemical agent is obtained by a method which includes adding and reacting bromine, under an inert gas atmosphere, with a mixed solution comprising water, an alkali and a sulfamic acid compound.

9. The filtration treatment method according to claim 6, wherein a pH of the prefiltration-treated water is 5.5 or higher.

10. The filtration treatment method according to claim 6, wherein a pH of the water to be treated that is treated in the prefiltration is 5.5 or higher.

11. The filtration treatment system according to claim 2, wherein a pH of the prefiltration-treated water is 5.5 or higher.

12. The filtration treatment system according to claim 3, wherein a pH of the prefiltration-treated water is 5.5 or higher.

13. The filtration treatment system according to claim 2, wherein a pH of the water to be treated that is supplied to the prefiltration treatment filter is 5.5 or higher.

14. The filtration treatment system according to claim 3, wherein a pH of the water to be treated that is supplied to the prefiltration treatment filter is 5.5 or higher.

15. The filtration treatment method according to claim 7, wherein a pH of prefiltration water is 5.5 or higher.

16. The filtration treatment method according to claim 8, wherein a pH of the prefiltration-treated water is 5.5 or higher.

* * * * *